United States Patent Office 2,904,578
Patented Sept. 15, 1959

2,904,578

HALOARYLOXY LOWER ALKYL ESTER OF BORIC ACID

Harry F. Brust, Midland, Mich., assignor to The Dow Chemical Company, Midland, Mich., a corporation of Delaware No Drawing. Application February 3, 1958
Serial No. 712,656

5 Claims. (Cl. 260—462).

This invention is related to esters and is directed to the fully esterified products of reaction of boric acid with a haloaryloxy lower-alkanol. The new ester compounds are liquids or crystalline solids somewhat soluble in many organic solvents such as ethanol, xylene and kerosene and of very low solubility in water. They have been found to be useful as parasiticides and are adapted to be employed in dust and spray compositions for the control of insect organisms such as mites and aphids, and bacteria and fungi.

The new compounds may be prepared by causing a reaction between boric acid and a haloaryloxy lower-alkanol. The reaction is carried out in an inert organic solvent such as toluene, benzene, chlorobenzene, or carbon tetrachloride. Good results are obtained when the boric acid is reacted with an equivalent proportion of the haloaryloxy lower-alkanol reactant, i.e. when one molecular proportion of boric acid is employed with three molecular proportions of alkanol reactant.

In carrying out the reaction, the boric acid and haloaryloxy lower alkanol are dispersed in the solvent and the resulting mixture heated at a temperature of from 70 to 180° C. for a period of time to complete the reaction. During the reaction, a mixture of solvent and water of reaction may be continuously distilled out of the reaction vessel, condensed, and the solvent recovered. Additional solvent may be introduced into the reaction zone as may be necessary. Upon completion of the reaction, the solvent may be removed by evaporation or fractional distillation under reduced pressure to obtain the desired product as a liquid or crystalline residue.

The following examples illustrate the invention but are not to be construed as limiting.

*Example 1.—Tris[2-(2,4,5-trichlorophenoxy)-ethyl] borate*

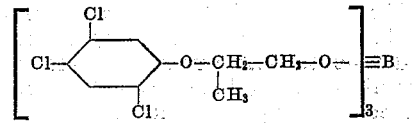

Boric acid (20.6 grams; 0.33 mole) and 241.5 grams (1 mole) of 2-(2,4,5-trichlorophenoxy)-ethanol were dispersed in 300 milliliters of toluene and the resulting mixture heated for 6½ hours at a temperature of from 116 to 122° C. The heating was carried out with continuous distillation of toluene together with the water of reaction as formed, separation of the water and recycling of toluene. The resulting mixture was thereafter fractionally distilled under reduced pressure to separate the toluene solvent and obtain a tris [2-(2,4,5-trichlorophenoxy)-ethyl]borate product as a crystalline residue. This product melted at 120°–124° C. and had a boron content of 1.48 percent and a chlorine content of 42.86 percent as compared to theoretical contents of 1.48 percent and 43.6 percent, respectively.

*Example 2. — Tris[2-(2,4,5-trichlorophenoxy)-1-propyl] borate*

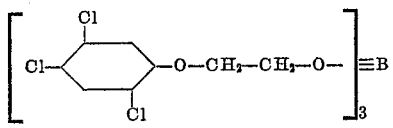

Boric acid (5.65 grams; 0.0913 mole) and 70 grams (0.274 mole) of 2-(2,4,5-trichlorophenoxy)-1-propanol were dispersed in 200 milliliters of toluene and the resulting mixture heated for 4 hours at a temperature of from 110° to 120° C. The heating was carried out with the continuous distillation of toluene together with water of reaction as formed, separation of the water and recycling of the toluene. Upon completion of the reaction, the reaction mixture was fractionally distilled under reduced pressure at gradually increasing temperatures up to a temperature of 110° C. at one millimeter pressure to remove toluene solvent and obtain a tris[2-(2,4,5-trichlorophenoxy)-1-propyl]borate as a liquid residue. This product had a refractive index $n/D$ of 1.5740 at 25° C., and contained 1.35 percent boron and 39.73 percent chlorine as compared to theoretical contents of 1.4 and 41.2 percent respectively.

*Example 3.—Tris[4-(2,4-dichlorophenoxy)-1-butyl] borate*

Boric acid (4.12 grams; 0.0667 mole) and 47 grams (0.2 mole) of 4-(2,4-dichlorophenoxy)-1-butanol were dispersed in 300 milliliters of toluene and the resulting mixture heated for 8 hours at a temperature of from 110 to 114° C. The heating was carried out with the continuous distillation of toluene and water of reaction as formed, separation of the water and recycling of the toluene. Upon completion of the reaction, the reaction mixture was fractionally distilled under reduced pressure to separate toluene solvent and obtain a tris[4-(2,4-dichlorophenoxy)-1-butyl]borate product as a liquid residue. This product had a specific gravity of 1.305 at 25°/25° C., a refractive index $n/D$ of 1.5567 at 25° C. and boron and chlorine contents of 1.42 and 29.0 percent, respectively, as compared to theoretical contents of 1.52 and 29.9 percent.

*Example 4.—Tris[4-(2-methyl-4-chlorophenoxy)-1-butyl]borate*

Boric acid (0.33 mole) and one mole of 4-(2-methyl-4-chlorophenoxy)-1-butanol are reacted together in 300 milliliters of toluene as described in Example 2. Upon completion of the reaction, the reaction mixture is distilled under reduced pressure to remove toluene solvent and obtain a tris[4-(2-methyl-4-chlorophenoxy)-1-butyl] borate product as a liquid residue. Tris[4-(2-methyl-4-chlorophenoxy)-1-butyl]borate has a molecular weight of 651.86.

*Example 5.—Tris[3-(4-bromophenoxy)-1-butyl]borate*

Boric acid (0.33 mole) and 1 mole of 3-(4-bromophenoxy)-1-butanol are reacted together in 300 milliliters of toluene as described in Example 2. The reaction mixture is thereafter fractionally distilled under reduced pressure to remove toluene solvent and obtain a tris[3-(4-bromophenoxy)-1-butyl]borate product as a liquid residue. Tris[3-(4-bromophenoxy)-1-butyl]borate has a molecular weight of 694.6.

In a similar manner, other fully esterified reaction products of boric acid with a haloaryloxy lower-alkanol may be prepared as follows:

Tris[2-(2,3,4,5 - tetrachlorophenoxy) - ethyl]borate by reacting boric acid with 2-(2,3,4,5-tetrachlorophenoxy)-ethanol.

Tris[1-(2,4,5-tribromophenoxy)-2-propyl]borate by reacting boric acid with 1-(2,4,5-tribromophenoxy)-2-propanol.

Tris[2-(2,4-dibromophenoxy)-1-propyl]borate by reacting boric acid with 2-(2,4-dibromophenoxy)-1-propanol.

The neutral esters of the present invention are useful as parasiticides and herbicides. For such use, the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents of oil-in-water emulsions or aqueous dispersions with or without the aid of a wetting, dispersing or emulsifying agent. In representative operations, the application of aqueous spray compositions containing 0.05 percent by weight of tris[4-(2,4-dichlorophenoxy)-1-butyl]borate to foliage of plants heavily infested with two-spotted spider mites gave substantially complete controls of the mites.

I claim:

1. A neutral ester of boric acid and a member selected from the group consisting of a halophenoxy lower-alkanols and halotoloxy lower alkanols of which each halogen has an atomic weight of from 30 to 80, inclusive, and wherein the term lower alkanol refers to an alkanol containing from 1 to 4 carbon atoms inclusive.

2. Tris[2-(2,4,5-trichlorophenoxy)-ethyl]borate.

3. Tris[2-(2,4,5-trichlorophenoxy)-1-propyl]borate.

4. Tris[4-(2,4-dichlorophenoxy)-1-butyl]borate.

5. A method of preparing a fully esterified reaction product of boric acid and a member selected from the group consisting of halotoloxy lower alkanols and halophenoxy lower alkanols which consists of heating together boric acid and approximately an equivalent proportion of the member selected from the aforesaid group at a temperature of 70°–180° C. in an inert reaction solvent for a period of time and continuously removing water of reaction from the reaction site throughout the reaction time.

No references cited.